US005590893A

United States Patent [19]

Robinson et al.

[11] Patent Number: 5,590,893

[45] Date of Patent: Jan. 7, 1997

[54] WHEELCHAIR FRAME ASSEMBLY

[75] Inventors: William G. Robinson; James C. Thorpe, both of Fresno, Calif.

[73] Assignee: No Limit Designs, Inc., Fresno, Calif.

[21] Appl. No.: 365,261

[22] Filed: Dec. 28, 1994

[51] Int. Cl.$^6$ .......... B62M 1/14

[52] U.S. Cl. .......... 280/250.1; 280/304.1; 297/DIG. 4

[58] Field of Search .......... 280/250.1, 304.1, 280/661, 647, 642, 648, 650; 297/DIG. 4; 180/907

[56] References Cited

U.S. PATENT DOCUMENTS

| | | |
|---|---|---|
| D. 254,970 | 5/1980 | Honzyou . |
| D. 278,217 | 4/1985 | Nassari . |
| D. 306,712 | 3/1990 | Friedrich . |
| D. 344,702 | 3/1995 | Robertson et al. . |
| 3,379,450 | 4/1968 | Jones et al. . |
| 3,882,949 | 5/1975 | Anderson . |
| 4,405,142 | 9/1983 | Whetstine . |
| 4,477,098 | 10/1984 | Minnebraker . |
| 4,650,201 | 3/1987 | Hartwell . |
| 4,652,005 | 3/1987 | Hartwell . |
| 4,721,321 | 1/1988 | Haury et al. . |
| 4,730,842 | 3/1988 | Summers et al. . |
| 4,768,797 | 9/1988 | Friedrich . |
| 4,805,925 | 2/1989 | Haury et al. . |
| 4,813,963 | 3/1989 | Lockard et al. . |
| 4,955,624 | 9/1990 | Jeun-Long . |
| 4,966,379 | 10/1990 | Mulholland . |
| 4,969,232 | 11/1990 | Michel . |
| 4,989,890 | 2/1991 | Lockard . |
| 5,020,816 | 6/1991 | Mulholland . |
| 5,028,064 | 7/1991 | Johnson . |
| 5,060,962 | 10/1991 | McWethy . |
| 5,131,672 | 7/1992 | Robertson . |
| 5,152,543 | 10/1992 | Sims et al. . |
| 5,253,888 | 10/1993 | Friedrich . |
| 5,259,635 | 11/1993 | Picker . |
| 5,267,745 | 12/1993 | Robertson . |
| 5,333,894 | 8/1994 | Mayes . |
| 5,409,247 | 4/1995 | Robertson et al. . |

FOREIGN PATENT DOCUMENTS

| | | |
|---|---|---|
| 501986 | 5/1954 | Canada . |
| 312969A2 | 4/1988 | European Pat. Off. . |

OTHER PUBLICATIONS

Action Pro product literature, pp. 10, 11, update Aug. 31, 1993.

*Primary Examiner*—Brian L. Johnson
*Assistant Examiner*—F. Zeender
*Attorney, Agent, or Firm*—Townsend and Townsend and Crew LLP

[57] ABSTRACT

Drive wheel axle assemblies (34) and caster wheel assemblies (94) are mounted to a wheelchair frame (4). Each axle assembly includes an axle adjustment tube (40) secured to the frame and an axle housing (56), defining an axle bore (58), toollessly mounted to the axle adjustment tube at any of several rotary orientations to determine the camber of the drive wheel (36) mounted to the axle assembly. The front to rear position of the axle housing can also be adjusted in a toolless manner using a quick release pin (66). The height of the front end (10) of the frame is changed, to ensure that the caster wheel pivot axis (96) remains vertical, without tools by mounting a caster wheel (98) at various vertical positions within a caster spool housing (100) using a quick release pin (122).

22 Claims, 9 Drawing Sheets

WHEELCHAIR FRAME ASSEMBLY

BACKGROUND OF THE INVENTION

During the last couple of decades, wheelchairs suitable for action or sports use, such as playing basketball, tennis and other activities, have come into use. The chairs are characterized by their light weight and adjustable wheels. The wheels can be adjusted so that their camber can be changed from 0°, that is with the rear, driving wheels located in a vertical plane, to 12°, or sometimes more, where the top of the wheel is closer to the chair than the bottom of the wheel. By changing the camber on the drive wheels, height of the front caster wheels also needs to be changed to keep the main pivot axis of the caster wheel vertical.

With conventional sport or action chairs, the camber adjustment takes the user a significant amount of time. Adjusting the camber often requires removing quite a number of parts and adding or subtracting washers to achieve the proper angle. Even when done by a trained technician, the process still takes considerable time. It is a cumbersome, time-consuming job, and requires use of a wrench to torque the nut to proper tightness. During this procedure, in which two washers typically represent 3° of camber, it is easy to lose washers and to mount the wrong number of washers to the mounting bolt, requiring the job to be redone.

SUMMARY OF THE INVENTION

The present invention solves many of the problems of conventional sport wheelchairs. All adjustments to the camber of the drive wheels and height of the front caster wheels are made without tools but completely by hand, and without the need for changing or adding additional parts.

A wheelchair frame assembly made according to the invention includes a frame having spaced-apart lower portions to which drive wheel axle assemblies and caster wheel assemblies are mounted. Each axle assembly includes an axle adjustment member, typically a tube, secured to the frame and an axle housing, defining an axle bore, mounted to the axle adjustment tube at a chosen rotary orientation. The chosen rotary orientation determines the camber of the drive wheel mounted to the axle assembly. The mounting of the axle housing is accomplished without the use of tools so that the user can manually change the camber of the drive wheel in an extremely simple manner.

The front to rear position of the axle housing can also be, in the preferred embodiment, adjusted in a toolless manner, typically through the use of a quick release pin designed to engage or disengage various recesses formed in the axle adjustment tube. The axle housing preferably includes an axle adjustment block and an adjustable axle lug mounted within a transverse bore formed in the axle adjustment block. The axle lug defines an axle bore within which a quick release axle, which passes through the drive wheel, is housed. The position of the adjustable axle lug can be changed to move the hub of the drive wheel closer towards or farther away from the frame to accommodate personal preferences and to ensure that the wheel does not rub against the frame as the camber of the drive wheel is changed.

Changing the camber of the drive wheel requires that the distance between the front end of the frame and the support surface be changed to ensure that the caster wheel pivot axis remains vertical. This is preferably accomplished in a toolless manner by mounting the caster spool of the caster wheel to the frame at various vertical positions using a caster spool housing. A quick release pin engages selected indentations or recesses in the caster spool so to lock the caster spool to the caster spool housing at the desired height without the use of tools.

The primary advantage of the invention is that the desired positional adjustments are all simply made without the need for tools; this makes making such adjustments easy and quick. No additional parts, such as shims or washers, are needed to change the camber or other position or orientation of the drive wheels or caster wheels. This eliminates the need for carrying such extra parts and the possibility of losing necessary parts.

Another advantage of the invention is that its simplicity of design and ease of assembly can reduce assembly costs for the manufacturer. This translates into a lower cost chair for the user.

Other features and advantages of the invention will appear from the following description, in which the preferred embodiment has been set forth in detail in conjunction with accompanying drawings.

DESCRIPTION OF THE PREFERRED EMBODIMENT

Figure 1:
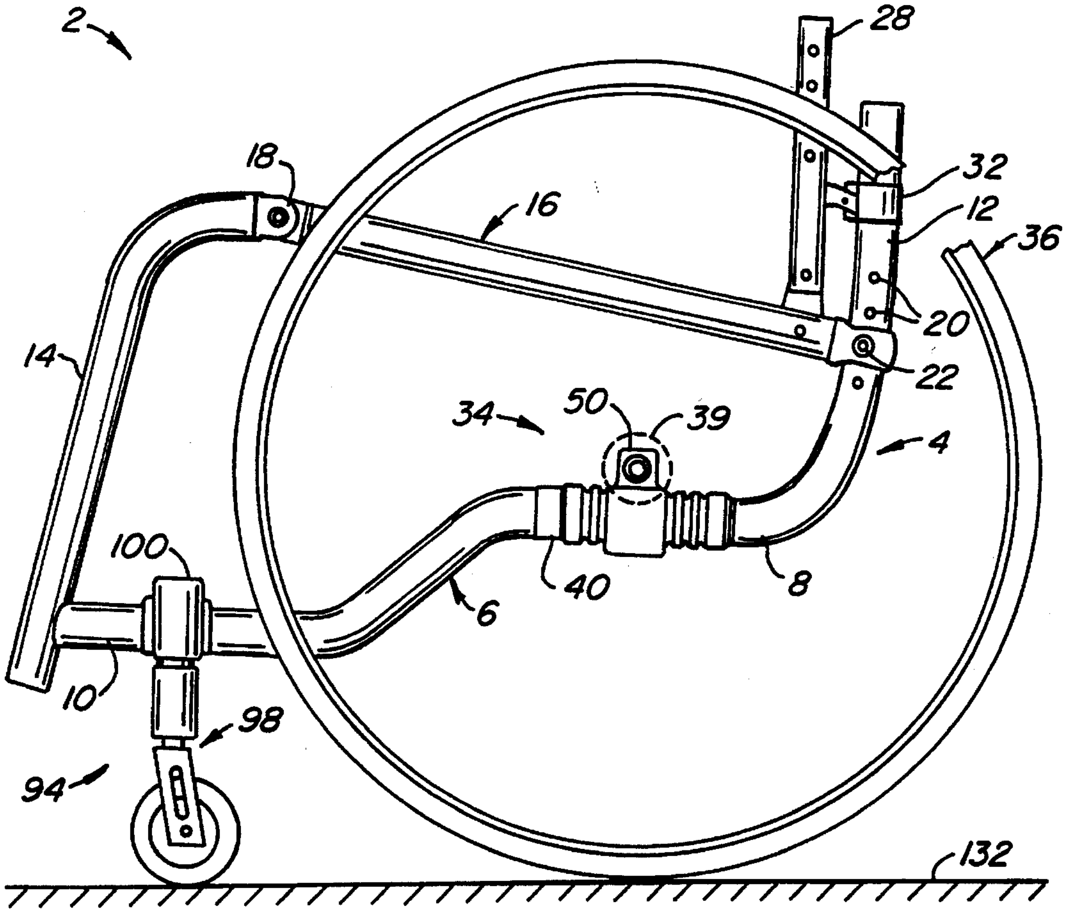
FIG. 1 is a side elevational view showing a wheelchair frame assembly made according to the invention.
Figure 2:
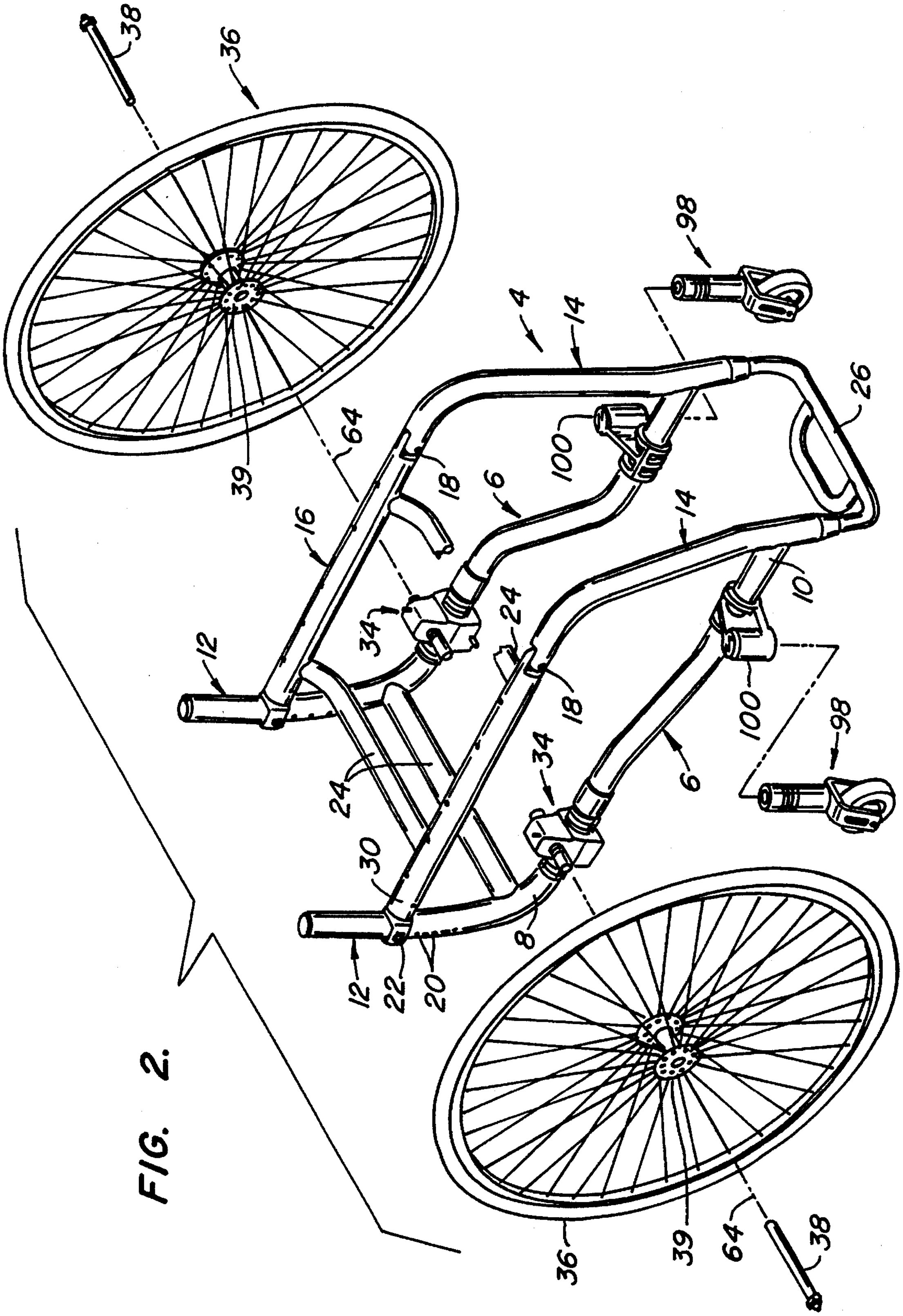
FIG. 2 is an exploded isometric view of the wheelchair frame assembly of FIG. 1 but without the seat back support shown in FIG. 1 but including a foot rest.

FIG. 1 illustrates a wheelchair frame assembly 2, most of the components of which are also shown in FIG. 2. Assembly 2 includes broadly a frame 4 having a pair of spaced-apart lower frame portions 6, each of which has a rear end 8 and a front end 10. A rear frame portion 12 extends upwardly from rear end 8 of lower frame portion 6 and a front frame portion 14 extends upwardly from front end 10 of lower frame portion 6. The upper ends of front and rear frame portions 14, 12 are coupled by seat portions 16. Seat portions 16 are each pivotally mounted to the upper end of front frame portion 14 at a pivot 18 and adjustably mounted to one of several positions 20 along rear from portion 12 through use of a quick release pin 22. Each of the sides of frame 4 are connected by lateral braces 24 and a footrest 26. An adjustable seat back support 28, shown in FIG. 1 only, is mounted to the rear end 30 of seat portion 16 and to rear frame portion 12 using a slider 32. A seat and backrest are mounted to frame assembly 2 during use but are not shown for simplicity of illustration.

Figure 3:
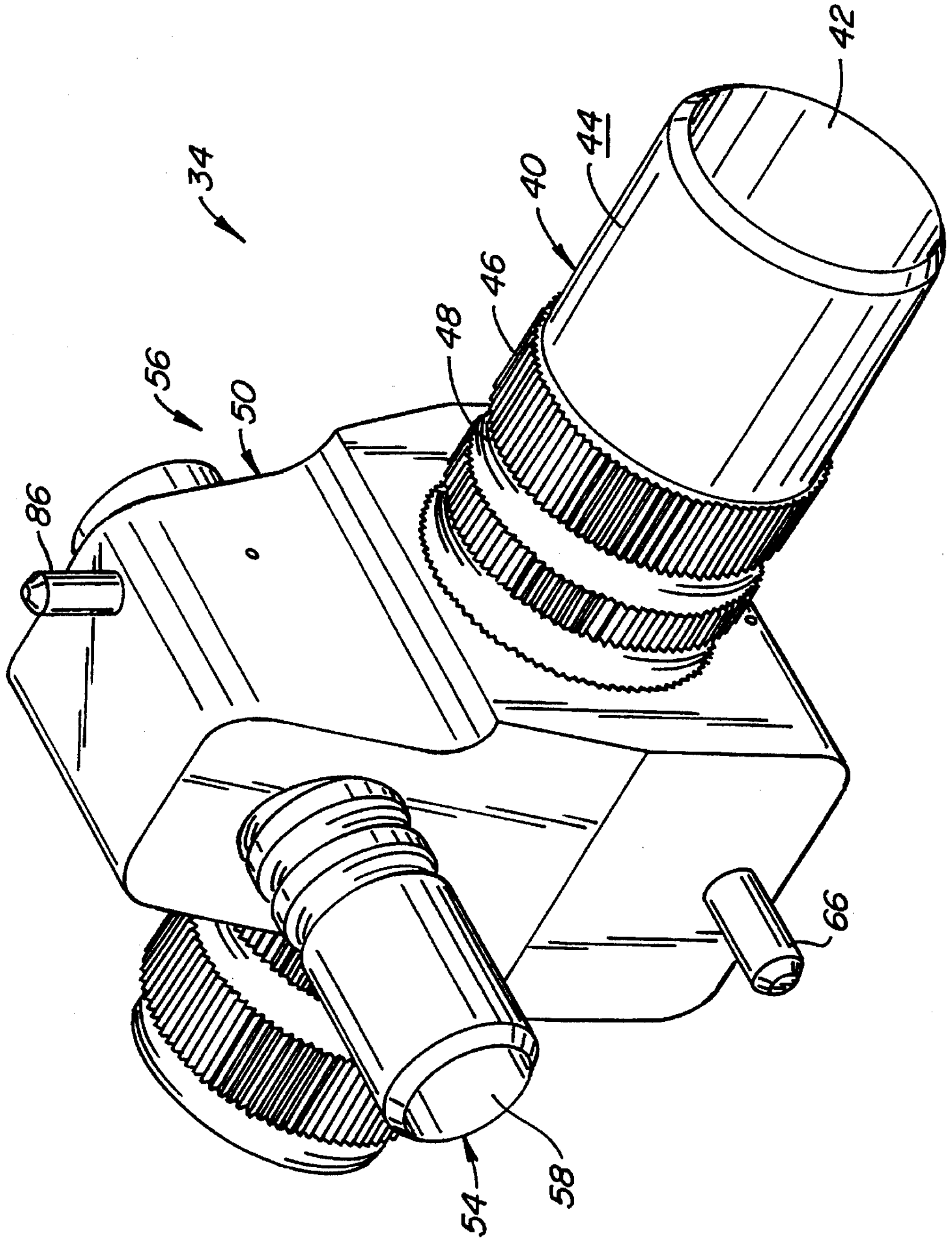
FIG. 3 is an enlarged view of the axle assembly of FIGS. 1 and 2.
Figure 3A:
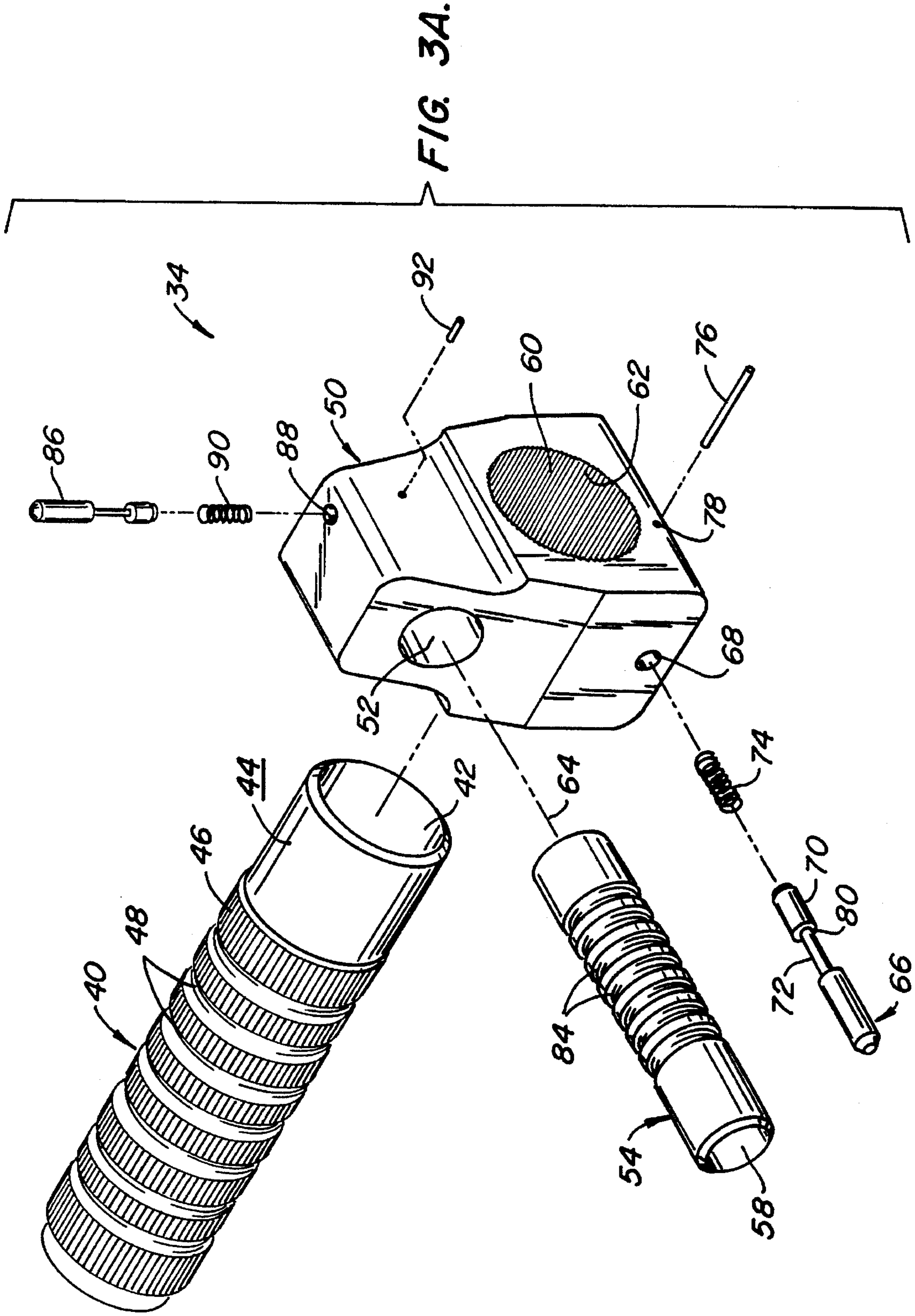
FIG. 3A is an exploded isometric view of the axle assembly of FIG. 3.

An axle assembly 34 is mounted to each lower frame portion 6 adjacent to rear end 8. Axle assembly 34 is used to mount a typically conventional drive wheel 36 using a conventional quick release axle 38 passing through the hub 39 of drive wheel 36. FIGS. 3 and 3A illustrate axle assembly 34 to include an axle adjustment member or tube 40 having a bore 42 sized to mount over and be secured to lower frame portion 6, typically by glue or other bonding agent. Tube 40 has an outer surface 44 including axially extending splines 46 and a series of axially extending, circumferential grooves 48 formed within the splined outer surface 44.

Axle assembly 34 also includes an axle adjustment block 50 having a transverse bore 52 sized to house a generally cylindrical, adjustable axle lug 54. Together, axle adjustment block 50 and adjustable axle lug 54 constitute an axle housing 56. Lug 54 defines an axle bore 58 within which quick release axle 38 is housed. Axle adjustment block 50 also includes a main bore 60 having a splined inner surface 62 constructed to mate with splines 46 on surface 44 of tube 40.

In the preferred embodiment, splined inner surface 62 and splines 46 on surface 44 contain ninety equally spaced splines, each spline spaced 4° apart. Since tube 40 is fixed to lower frame portion 6, the rotary orientation of block 50 relative to tube 40 determines the angular inclination of a drive wheel axis 64 defined by axle bore 58 and thus the cant of wheel 36. To aid the user in the proper rotary orientation of block 50 and tube 40, appropriate alignment lines can be drawn and labeled, for example 0°, 4°, 8°, 12°, on surface 44 of axle adjustment tube 40 for alignment with an appropriate index marker on axle adjustment block.

Figure 5A:
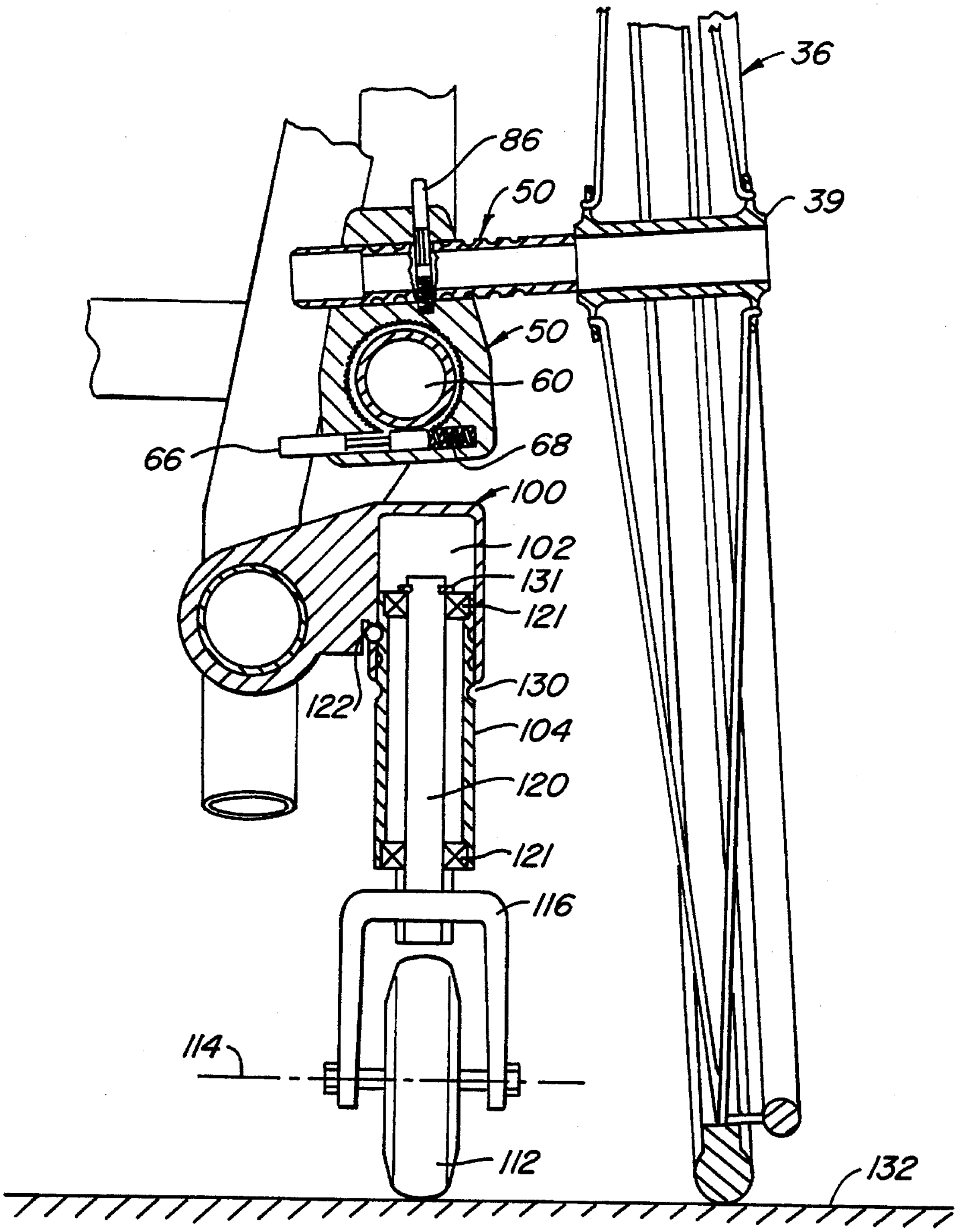
FIGS. 5A–5C are partial cross-sectional views showing the axle assembly and caster wheel assembly when the drive wheel is at a 4° camber, an 8° camber, and a 12° camber, respectively.
Figure 5B:
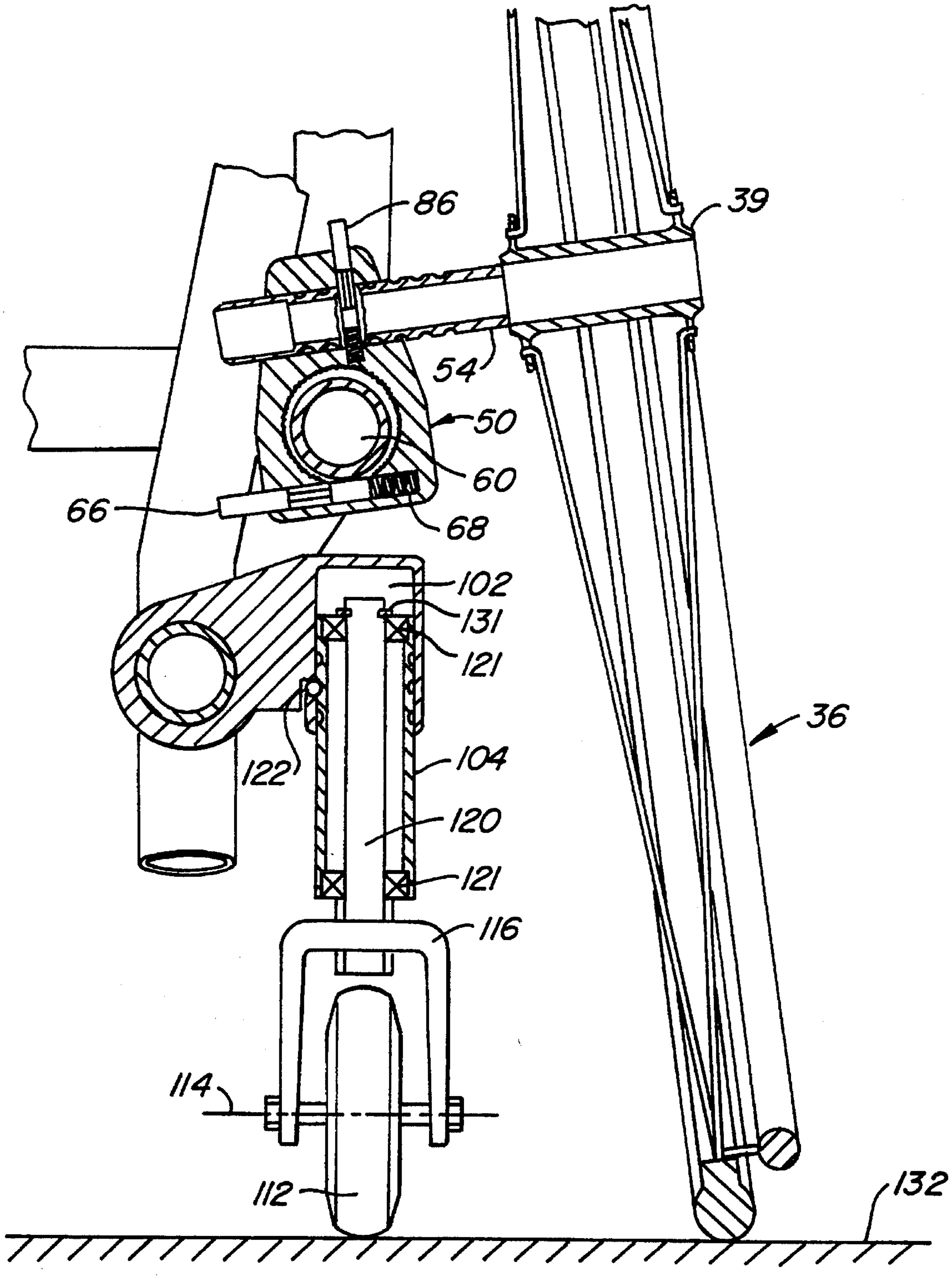
Figure 5C:
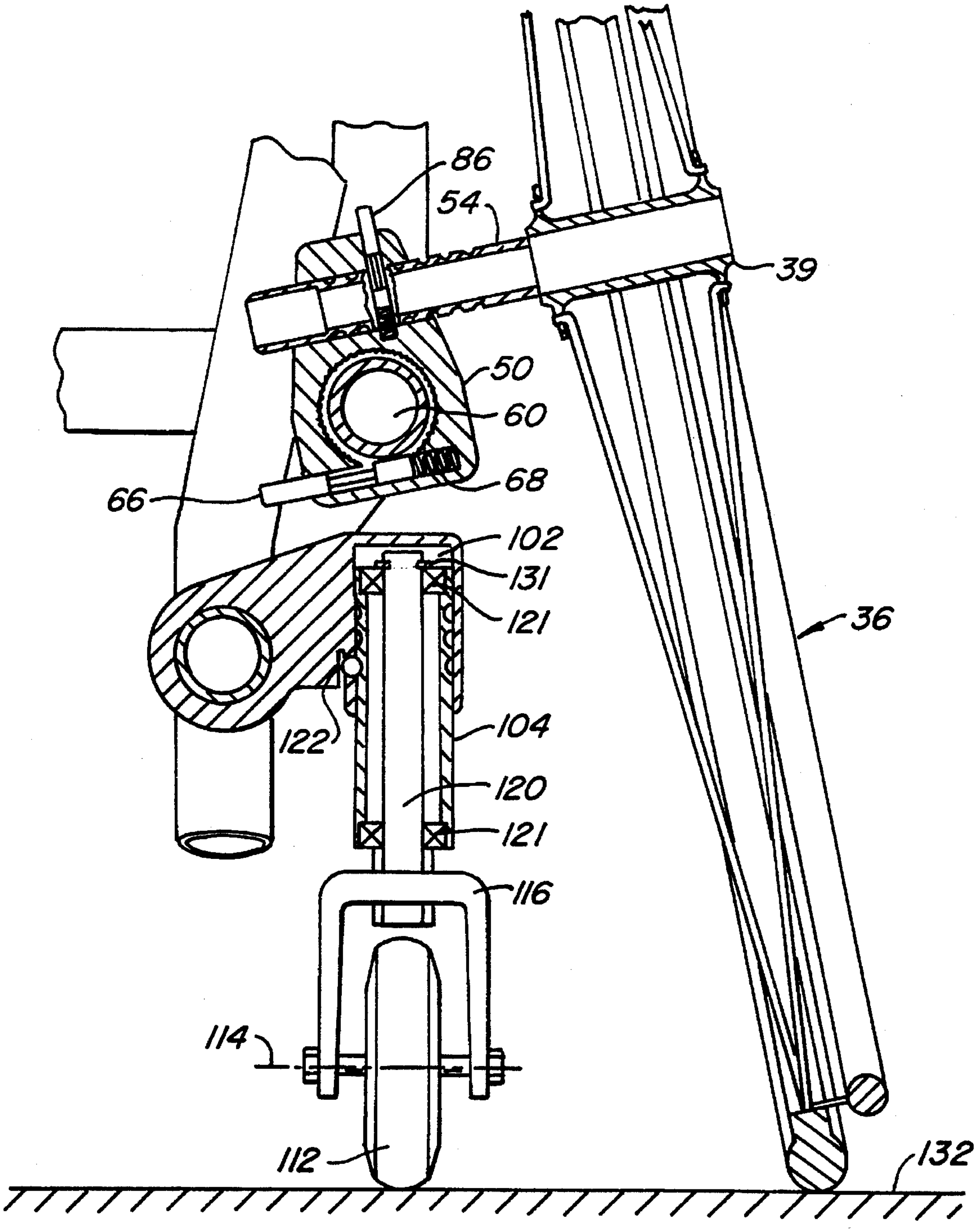

Block 50 is locked at a front-to-back position along surface 44 of tube 40 through the use of a quick release pin 66 mounted within a blind bore 68 which intersects main bore 60, as shown in FIGS. 5A–5C. Pin 60 has a full diameter portion 70 and a reduced diameter portion 72, the end of full diameter portion 70 pressing against a compression coil spring 74 which normally biases pin 66 out of blind bore 68. To keep pin 66 housed within blind bore 68, a roll pin 76 is pressed into a roll pin hole 78, formed transverse to blind bore 68, to intersect the blind bore and engage a shoulder 80 of pin 66 between portions 70, 72. Accordingly, when quick release pin 66 is in the locked or use position of FIG. 3, full diameter portion 70 is partially within main bore 60 and is in one of grooves 48 formed in surface 48 of tube 40.

To adjust the front/back position of drive wheel 36, the user simply presses on quick release pin 66 so to disengage full diameter portion 70 from groove 48, which permits axle housing 56 to slide along axle adjustment tube 40. When the desired front/back position is achieved, quick release pin 66 is released and full diameter portion 70 snaps into the groove 48 with which it is aligned. Changing the camber of wheel 36 is similar but axle housing 56 is moved in a forward direction until splined inner surface 62 completely disengages splines 46 to permit axle housing 56 to be rotated relative to tube 40 and then slid back onto tube 40 when the proper rotary orientation, and thus the proper camber, is achieved.

The distance wheel hub 40 is from frame 4 can be changed based upon the user's personal preference and also to keep the top of drive wheel 36 from rubbing against frame 4 when larger cambers, such as 12°, are used. To do so, adjustable axle lug 54 has a set of circumferential grooves 84 formed in its outer surface. Grooves 84 are engaged by a quick release pin 86 housed within a blind bore 88 and biased outwardly by compression coil spring 90 in a manner similar to quick release pin 66. Pin 86 is kept from being urged completely out of hole 88 by a roll pin 92. Pressing on quick release pin 86 allows the user to adjust the position of axle lug 54 along drive wheel axis 64, thus changing the location of drive wheel hub 40 relative to frame 4.

Figure 4:
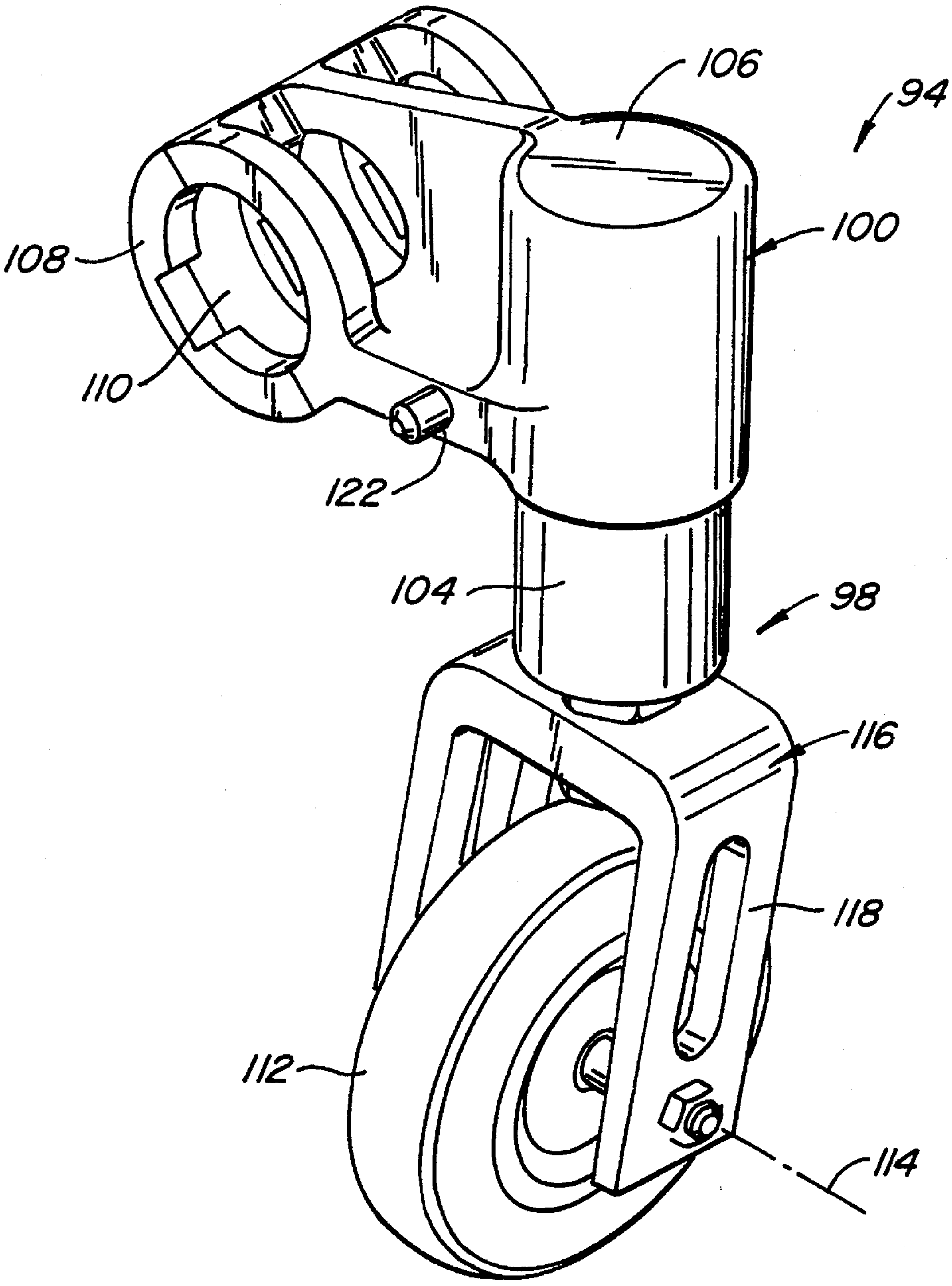
FIG. 4 is an enlarged view of the caster wheel assembly of FIGS. 1 and 2.
Figure 4A:
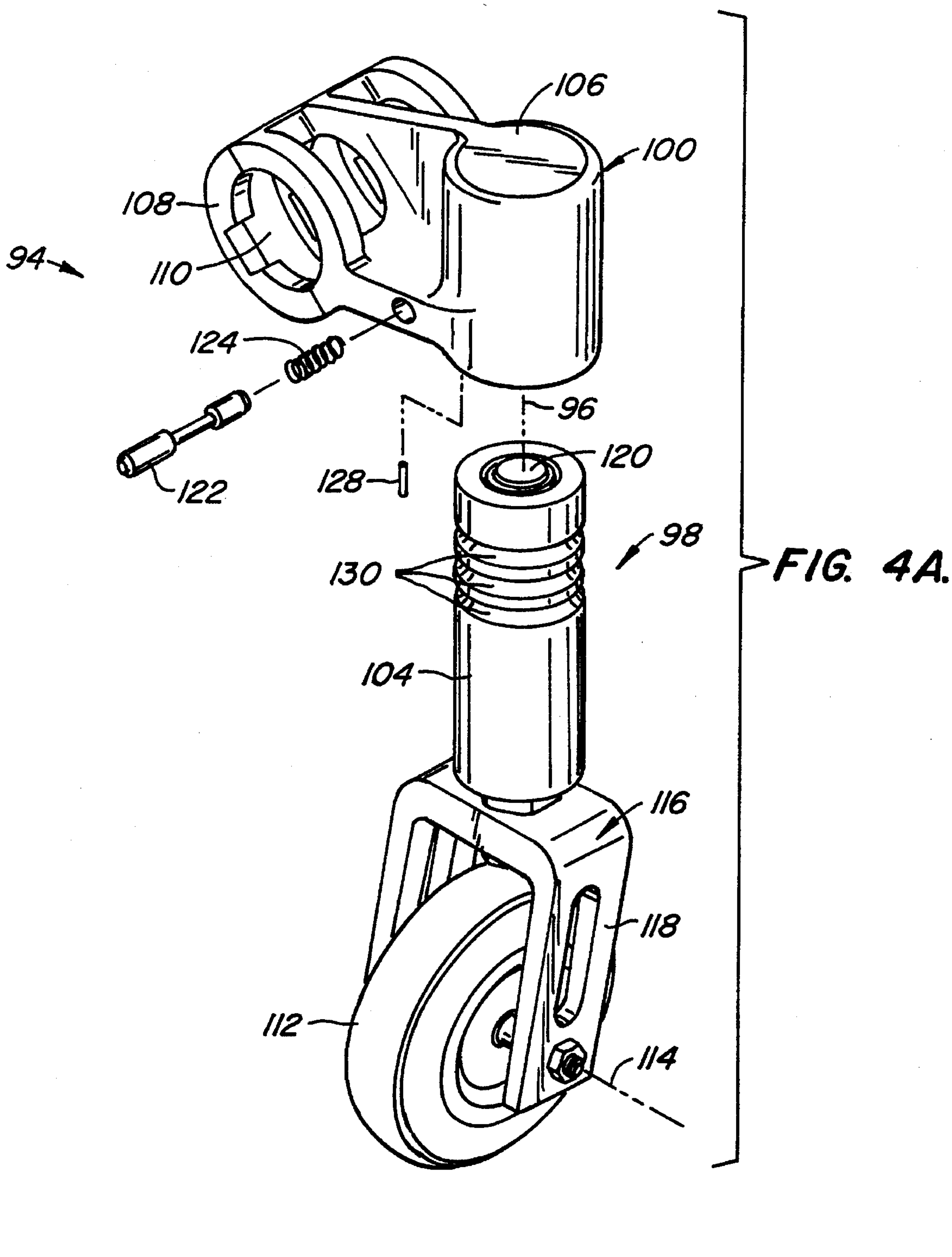
FIG. 4A is an exploded isometric view of the caster wheel assembly of FIG. 4.

Adjusting the camber of drive wheel 36 often requires adjusting caster wheel assembly 94 to ensure that the pivot axis 96 of caster wheel assembly 94 remains substantially vertical to ensure the proper action of caster wheels 98. FIGS. 4 and 4A illustrate a caster wheel assembly 94, including a two-piece caster spool housing 100 having a blind bore 102, see FIGS. 5A–5C, within which the generally cylindrical caster spool 104 of caster wheel 98 is housed. Housing 100 includes a main portion 106 and a clamping portion 108 which define a cylindrical opening 110 sized to surround lower frame portion 6 adjacent front end 10 so to permit caster spool housing 100 to be clamped firmly to lower frame portion 6 using, for example, screws or bolts (not shown).

Caster wheel 98 includes a wheel 112 having a generally horizontal axis 114 mounted to a fork-like wheel mount 116 having a clevis portion 118 and a spindle portion 120 coaxial with pivot axis 96 and pivotally housed within caster spool 104. Caster wheel assembly 94 also include a quick release pin 122 and a compression spring 124 housed within a blind bore 126 formed in housing 100; pin 122 is maintained within blind bore by a roll pin 128. Quick release pin 122, when in its normal outwardly biased position of FIG. 4, engages one of three grooves 130 formed in the outer surface of caster spool 104 to adjust the position of caster spool 104 within blind bore 102 and thus the distance between wheel 112 and lower frame portion 6.

FIG. 5A illustrates drive wheel 36 at a 4° camber. In this position, quick release pin 122 engages the upper most of grooves 130 to maintain caster wheel pivot axis 96 vertical. It has been found that this upper most groove 130 is also usable when drive wheel 36 is adjusted for a 0° camber; the difference in height of rear end 8 of lower frame portion 6 above support surface 132 when at a 0° camber and a 4° camber is very small (0.25%) so as not to require a separate groove 130 for both the 0° camber and the 4° camber. FIGS. 5B and 5C illustrate drive wheel 36 at an 8° camber and a 12° camber, respectively. (Note that in FIGS. 5A–5C, quick release axle 38 is not shown.) With each of these increasing camber angles, quick release pin 122 engages a still lower groove 130, thus lowering front end 10 of lower frame portion 6 in an amount substantially equal to the distance rear end 8 of lower frame portion 6 is lowered at each of these different camber angles. In FIGS. 5A–5C the position of quick release pin 86 within one of groove 84 of adjustable axle lug 54 is not changed. If desired, the position of lug 54 within transverse bore 52 can be changed to change the distance between hub 40 and lower frame portion 6 to accommodate the personal preferences of the user and ensure that top of drive wheel 36 does not rub against or otherwise interfere with frame 4.

In use, the camber of each drive wheel 36 is adjusted by first removing drive wheel 36 from axle assembly 34 by removal of quick release axle 38. The rotary orientation of axle assembly 34, and thus the camber of drive wheel 36, is adjusted by pressing on quick release pin 36 and sliding axle housing 56 in a forward direction, that is, towards caster wheel assembly 94, until splines 46 disengage from splined inner surface 62. Axle housing 56 is then rotated the appropriate amount and slid back to re-engage splines 46 with splined inner surface 62. When the proper position of axle housing 56 is achieved, quick release pin 66 is released to permit full diameter portion 72 to engage the appropriate groove 48, thus locking axle housing 56 in position. If the distance between drive wheel hub 40 and lower frame 46 is to be changed, quick release pin 86 is depressed and adjustable axle lug 54 is moved within transverse bore 52 until properly positioned, at which time pin 86 is released to lock lug 54 in place. Drive wheel 36 can then be remounted to axle housing 56 using quick release axle 38 passing through drive wheel hub 39. When necessary, the height of front end 10 of lower frame portion 6 above support surface 132 can be adjusted by pressing on quick release pin 122, moving caster spool 104 within blind bore 102 and releasing quick release pin 122 when aligned with the appropriate groove 130.

In the preferred embodiment, quick release pins engaging circumferential grooves are the toolless means for permitting many of the manual adjustments of axle assembly 34 and caster wheel assembly 94. If desired, other types of toolless engagement devices could be used, such as having the ends of spring-biased pins engaging holes or other depressions in the object to be locked in place. Various thumb screw type, detented twist lock fasteners could be used instead of quick release pins to engage or disengage various grooves according to whether the object is to be moved or locked in place. Instead of having axle adjustment tube 40 fixed to lower frame portion 6, tube 40 could be pinned in place at both ends allowing, for example, 1° shifts in the rotary orientation of the tube to permit adjustments in the camber at other than the set 4° increments available with the disclosed embodiment. Of course, splines or other similar such engagement elements permitting finer or coarser camber adjustment can also be used. Caster spool 104 and axle lug 54 are shown to be generally cylindrical; they, along with their mating bores, could have shapes other than cylindrical, such as D-shaped; caster spool 104 and axle lug 54 need not rotate within their bores since spindle portion 120 and axle 38 provide the necessary rotation about axis 96 and axis 64, respectively.

Other modifications and variations can be made to the disclosed embodiment without departing from the subject of the invention as defined in the following claims. For example, individual footrests could be used instead of footrest 26.

What is claimed is:

1. A wheelchair axle assembly, used to mount a wheelchair drive wheel to the frame of a wheelchair, comprising:

an axle adjustment member securable to the wheelchair frame and having an outer surface;

an axle housing, defining an axle bore, mounted to the axle adjustment member, the axle bore defining a drive wheel axis;

means for toollessly securing the axle housing to the axle adjustment member; and said toollessly securing means including means for varying the angular attitude of the axle housing relative to the wheelchair frame thereby varying the angular attitude of the drive wheel axis and thus the camber of the drive wheel.

2. The axle assembly according to claim 1 wherein the axle housing includes an axle adjustment block and an axle lug defining said axle bore, and further comprising means for toollessly positioning the axle lug at a selected one of a plurality of chosen positions within the axle adjustment block and along the drive wheel axis.

3. A wheelchair axle assembly, used to mount a wheelchair drive wheel to the frame of a wheelchair, comprising:

an axle adjustment member securable to the wheelchair frame and having an outer surface;

an axle housing, defining an axle bore, mounted to the axle adjustment member, the axle bore defining a drive wheel axis;

the axle housing including an axle adjustment block and a tubular lug having an outer surface and defining said axle bore;

means for toollessly positioning the axle lug at a chosen position within the axle adjustment block and along the drive wheel axis, the toolless positioning means comprising:

a plurality of axially spaced-apart grooves formed in the outer surface of the axle lug; and a quick release pin assembly mounted to the axle adjustment block and adapted to engage one of said grooves when aligned therewith when in a locked position and to disengage from said grooves when in an adjustment position;

means for toollessly securing the axle housing to the axle adjustment member; and said toollessly securing means including means for varying the angular attitude of the drive wheel axis and thus the camber of the drive wheel.

4. The axle assembly according to claim 1 wherein the axle adjustment member is a tubular member.

5. The axle assembly according to claim 4 wherein the axle housing includes a main bore sized to house the axle adjustment member and the angular attitude varying means includes a splined inner surface at least partially defining the main bore and a splined outer surface, sized to mate with the splined inner surface, over at least a part of the outer surface of the axle adjustment member.

6. The axle assembly according to claim 5 wherein said splined surfaces have splines 4° apart so to permit adjustment of said camber in 4° increments.

7. A wheelchair axle assembly, used to mount a wheelchair drive wheel to the frame of a wheelchair, comprising:

a tubular axle adjustment member securable to the wheelchair frame and having an outer surface;

an axle housing, defining an axle bore, mounted to the axle adjustment member, the axle bore defining a drive wheel axis;

the axle housing including a main bore sized to house the axle adjustment member;

means for toollessly securing the axle housing to the axle adjustment member;

said toollessly securing means including means for varying the angular attitude of the drive wheel axis and thus the camber of the drive wheel; and the angular attitude varying means including a splined inner surface at least partially defining the main bore and a splined outer surface, sized to mate with the splined inner surface, over at least a part of the outer surface of the axle adjustment member; and the toollessly securing means including means for toollessly positioning the axle housing at a plurality of positions along said axle adjustment member thereby varying the position of the drive wheel in a front-to-rear direction.

8. The axle assembly according to claim 7 wherein the toollessly positioning means includes:

a plurality of axially spaced-apart grooves formed in the outer surface of the axle adjustment member; and a quick release pin assembly mounted to the axle adjustment block and adapted to engage one of said grooves when aligned therewith when in a locked position and to disengage from said grooves when in an adjustment position.

9. A wheelchair axle assembly, used to mount a wheelchair drive wheel to the frame of a wheelchair, comprising:

an axle adjustment member securable to the wheelchair frame and having an outer surface;

an axle housing, defining an axle bore, mounted to the axle adjustment member, the axle bore defining a drive wheel axis;

the axle housing and the axle adjustment member including complementary engagement surfaces so that said axle housing can be positioned at a selected one of a preselected plurality of rotary orientations relative to the axle adjustment member;

said complementary engagement surfaces configured to interferingly engage one another when at said selected one of a plurality of rotary orientations to prohibit free relative rotary movement between the axle adjustment member and the axle housing; and a toolless, hand-operated securing device carried by a chosen one of the axle housing and the axle adjustment member adapted to engage the other of said chosen one of the axle housing and the axle adjustment member so to secure said axle housing to said axle adjustment member in said selected one of a plurality of rotary orientations.

10. A wheelchair axle assembly, used to mount a wheelchair drive wheel to the frame of a wheelchair, comprising:

an axle adjustment member securable to the wheelchair frame and having an outer surface;

an axle housing, defining an axle bore, mounted to the axle adjustment member, the axle bore defining a drive wheel axis;

the axle housing and the axle adjustment member including splined complementary engagement surfaces so that said axle housing can be positioned at a selected one of a plurality of rotary orientations relative to the axle adjustment member; and a hand-operated securing device carried by a chosen one of the axle housing and the axle adjustment member adapted to engage the other of said chosen one of the axle housing and the axle adjustment member so to secure said axle housing to said axle adjustment member in said selected rotary orientation.

11. A wheelchair axle assembly, used to mount a wheelchair drive wheel to the frame of a wheelchair, comprising:

an axle adjustment member securable to the wheelchair frame and having an outer surface;

an axle housing, defining an axle bore, mounted to the axle adjustment member, the axle bore defining a drive wheel axis;

the axle housing and the axle adjustment member including complementary engagement surfaces so that said axle housing can be positioned at a selected one of a plurality of rotary orientations relative to the axle adjustment member;

a hand-operated securing device carried by a chosen one of the axle housing and the axle adjustment member adapted to engage the other of said chosen one of the axle housing and the axle adjustment member so to secure said axle housing to said axle adjustment member in said selected rotary orientation; and the hand-operated securing device including a spring-biased quick release pin assembly including reduced diameter and increased diameter portions.

12. The axle assembly according to claim 11 wherein the quick release pin assembly is mounted to the axle housing.

13. The axle assembly according to claim 12 wherein the axle adjustment member has a plurality of axially spaced circumferential grooves formed in the outer surface thereof for engagement with the increased diameter portion of the quick release pin so that the quick release pin can secure the axle housing to the axle adjustment member at a plurality of positions along the axial adjustment member.

14. A wheelchair frame assembly comprising:

a frame including a pair of spaced-apart lower frame portions each having a front end and a back end;

an axle assembly mounted to each of the lower frame portions towards their back ends, each axle assembly comprising:

an axle adjustment member securable to the wheelchair frame and having an outer surface;

an axle housing, defining an axle bore, mounted to the axle adjustment member, the axle bore defining a drive wheel axis;

means for toollessly securing the axle housing to the axle adjustment member; and said toollessly securing means including means for varying the angular attitude of the drive wheel axis and thus the camber of the drive wheel; and a caster wheel assembly mounted to each of the lower frame portions towards their front ends, each caster wheel assembly comprising:

a caster spool housing secured to the lower frame portion, said housing including a caster spool cavity;

a caster wheel comprising a caster spool, having an upper end sized for engagement within the caster spool cavity, and defining a generally vertical caster wheel pivot axis, a wheel, having a generally horizontal axis, and a wheel mount pivotally mounting the wheel to the caster spool so that the horizontal axis of the wheel is laterally offset from the caster wheel pivot axis; and means for toollessly securing the caster spool to the caster spool housing at a chosen location along the caster wheel pivot axis;

whereby the distance between the wheel and the lower frame portion can be changed to accommodate change in the camber of the drive wheels by keeping the caster wheel axis substantially vertical.

15. The wheelchair frame assembly according to claim 14 wherein the caster spool cavity is a downwardly-opening blind cavity.

16. The wheelchair frame assembly according to claim 14 wherein the caster spool cavity and the caster spool are complementary mating elements.

17. The wheelchair frame assembly according to claim 14 wherein the caster spool cavity is substantially cylindrical.

18. The wheelchair frame assembly according to claim 14 wherein the caster spool has a substantially cylindrical external surface.

19. The wheelchair frame assembly according to claim 18 wherein the caster spool includes an outer surface and the toolless securing means includes grooves formed in said outer surface of said caster spool.

20. The wheelchair frame assembly according to claim 14 wherein the toolless securing means includes a quick release element mounted to the caster spool housing, said quick release element movable manually and without the use of a tool from a normal, spring-biased, locked position to an adjustment position, said release pin engaging a selected groove when in the locked position and being disengaged from said grooves when in adjustment position.

21. The wheelchair frame assembly according to claim 20 wherein the outer surface of the caster spools is generally cylindrical.

22. The wheelchair frame assembly according to claim 21 wherein said grooves formed in the outer surface of the caster spool are circumferentially-extending grooves.

* * * * *